(12) United States Patent
Yang et al.

(10) Patent No.: US 9,923,224 B2
(45) Date of Patent: Mar. 20, 2018

(54) PROTON EXCHANGE MATERIAL AND METHOD THEREFOR

(71) Applicants: AUDI AG, Ingolstadt (DE); TOYOTA JIDOSHA KABUSHIKI KAISHA, Toyota-Shi (JP)

(72) Inventors: Zhiwei Yang, South Windsor, CT (US); Mallika Gummalla, Longmeadow, MA (US); Yoichi Hosokawa, Ann Arbor, MI (US)

(73) Assignees: Audi AG, Ingolstadt (DE); Toyota Jidosha Kabushiki Kaisha, Toyota-Shi (JP)

( * ) Notice: Subject to any disclaimer, the term of this patent is extended or adjusted under 35 U.S.C. 154(b) by 200 days.

(21) Appl. No.: 14/654,455

(22) PCT Filed: Dec. 21, 2012

(86) PCT No.: PCT/US2012/071405
§ 371 (c)(1),
(2) Date: Jun. 19, 2015

(87) PCT Pub. No.: WO2014/098912
PCT Pub. Date: Jun. 26, 2014

(65) Prior Publication Data
US 2015/0333354 A1 Nov. 19, 2015

(51) Int. Cl.
| | | |
|---|---|---|
| *H01M 6/18* | (2006.01) |
| *H01M 8/1039* | (2016.01) |
| *B01J 39/20* | (2006.01) |
| *C08F 14/18* | (2006.01) |
| *C08J 5/22* | (2006.01) |
| *H01M 8/10* | (2016.01) |
| *H01M 8/02* | (2016.01) |
| *C08F 214/26* | (2006.01) |
| *H01M 8/1018* | (2016.01) |

(52) U.S. Cl.
CPC ........... *H01M 8/1039* (2013.01); *B01J 39/20* (2013.01); *C08F 14/18* (2013.01); *C08F 214/262* (2013.01); *C08J 5/22* (2013.01); *C08J 5/225* (2013.01); *C08J 5/2237* (2013.01); *C08J 5/2243* (2013.01); *H01M 8/02* (2013.01); *H01M 8/10* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 3,282,875 A | 11/1966 | Connolly et al. |
| 5,463,005 A | 10/1995 | Desmarteau |
| 5,608,022 A | 3/1997 | Nakayama et al. |
| 5,869,416 A | 2/1999 | Mussell |
| 5,882,810 A | 3/1999 | Mussell et al. |
| 6,106,963 A | 8/2000 | Nitta et al. |
| 6,232,264 B1 | 5/2001 | Lukehart et al. |
| 6,277,512 B1 | 8/2001 | Hamrock et al. |
| 6,294,612 B1 | 9/2001 | O'Brien |
| 6,733,914 B1 | 5/2004 | Grot et al. |
| 7,112,363 B2 | 9/2006 | Moya |
| 7,288,600 B2 | 10/2007 | Moya |
| 7,507,495 B2 | 3/2009 | Wang et al. |
| 7,615,307 B2 | 11/2009 | Wu et al. |
| 7,691,780 B2 | 4/2010 | Adzic et al. |
| 7,740,974 B2 | 6/2010 | Masel et al. |
| 7,837,901 B2 | 11/2010 | Hsu et al. |
| 7,855,021 B2 | 12/2010 | Adzic et al. |
| 7,906,052 B2 | 3/2011 | Hadj Romdhane et al. |
| 8,216,680 B2 | 7/2012 | Hsu et al. |
| 2002/0160272 A1 | 10/2002 | Tanaka et al. |
| 2003/0096156 A1 | 5/2003 | Asaoka et al. |
| 2004/0241518 A1 | 12/2004 | Yang |
| 2005/0075240 A1 | 4/2005 | Yamamoto |
| 2005/0095487 A1 | 5/2005 | Hamrock et al. |
| 2005/0112434 A1 | 5/2005 | Park et al. |
| 2005/0113528 A1 | 5/2005 | Jing et al. |
| 2005/0186467 A1 | 8/2005 | Sugiura |
| 2006/0093885 A1 | 5/2006 | Krusic et al. |
| 2007/0069185 A1 | 3/2007 | Hsu et al. |
| 2007/0218342 A1 | 9/2007 | Han et al. |
| 2007/0281199 A1 | 12/2007 | Lousenberg |

(Continued)

FOREIGN PATENT DOCUMENTS

| | | |
|---|---|---|
| CN | 1201554 A | 12/1998 |
| CN | 1964115 A | 5/2007 |

(Continued)

OTHER PUBLICATIONS

Xue, "Chemistry of Bis(perfluoroalkylsulfonyl)imides and Related Compounds," Dissertation presented to the Graduate School of Clemson University, Aug. 1996, 251 pages.
Creager et al., "New Bis[(perfluororalkyl)sulfonyl]imide Ionomers for PEM Fuel Cells," Polymeric Materials: Science and Engineering 80, 600 (1999).
Zhou, "Synthesis and Characterization of Perfluorinated Sulfonimide Copolymers as Polymer Electrolyte Membranes," Dissertation presented to the Graduate School of Clemson University, Dec. 2002, 212 pages.
Uematsu et al., "Synthesis of novel perfluorosulfonamide monomers and their application," Journal of Flourine Chemistry 127, 1087-1095 (2006).
Hao et al., "Synthesis of monodisperse palladium nanocubes and their catalytic activity for methanol electrooxidation", Chin. Phys. B, vol. 19, No. 10 (2010) 106104-1-106104-5.

(Continued)

*Primary Examiner* — Jane Rhee
(74) *Attorney, Agent, or Firm* — Seed IP Law Group LLP

(57) ABSTRACT

A proton exchange material includes a linear perfluorinated carbon backbone chain and a side chain extending off of the linear perfluorinated carbon backbone chain. The side chain includes at least one sulfonimide group, —SO2-NH—SO2-, and a carbon chain link between the at least one sulfonimide group and the linear perfluorinated carbon backbone chain. The carbon chain link has less than three carbon atoms.

9 Claims, No Drawings

(56) References Cited

U.S. PATENT DOCUMENTS

| | | |
|---|---|---|
| 2007/0282023 A1 | 12/2007 | Lousenberg |
| 2008/0206616 A1 | 8/2008 | Atanassova et al. |
| 2008/0292931 A1 | 11/2008 | Schwartz et al. |
| 2009/0026944 A1 | 1/2009 | Riviere-Cazaux |
| 2009/0053576 A1 | 2/2009 | Wu |
| 2009/0068541 A1 | 3/2009 | Yan et al. |
| 2009/0075139 A1 | 3/2009 | Kucernak et al. |
| 2009/0220682 A1 | 9/2009 | Monnier et al. |
| 2009/0269644 A1 | 10/2009 | Hamrock et al. |
| 2010/0008840 A1 | 1/2010 | Zhong et al. |
| 2010/0086831 A1 | 4/2010 | Fisher et al. |
| 2010/0086832 A1 | 4/2010 | Lopez et al. |
| 2010/0092841 A1 | 4/2010 | Lopez et al. |
| 2010/0099012 A1 | 4/2010 | Adzic |
| 2010/0216632 A1 | 8/2010 | Adzic et al. |
| 2010/0304267 A1 | 12/2010 | Mikhail et al. |
| 2010/0316937 A1 | 12/2010 | Sakamoto et al. |
| 2011/0200915 A1 | 8/2011 | Goto et al. |
| 2011/0223444 A1 | 9/2011 | Brown et al. |
| 2012/0046164 A1 | 2/2012 | Tanaka et al. |
| 2012/0251926 A1 | 10/2012 | Shirvanian |
| 2013/0059219 A1 | 3/2013 | Kimura et al. |
| 2013/0281555 A1 | 10/2013 | Yang et al. |
| 2013/0295486 A1 | 11/2013 | Shao |
| 2013/0319871 A1 | 12/2013 | Murata et al. |
| 2013/0330657 A1 | 12/2013 | Shoemaker et al. |
| 2014/0038078 A1 | 2/2014 | Shao |
| 2014/0178575 A1 | 6/2014 | Iio et al. |
| 2015/0255798 A1 | 9/2015 | Shao |
| 2015/0337064 A1 | 11/2015 | Yang et al. |
| 2015/0340721 A1 | 11/2015 | Yang et al. |

FOREIGN PATENT DOCUMENTS

| | | |
|---|---|---|
| CN | 1973391 A | 5/2007 |
| CN | 101318131 A | 12/2008 |
| CN | 101875010 A | 11/2010 |
| CN | 102039124 A | 5/2011 |
| JP | H10284087 A | 10/1998 |
| JP | H10340732 A | 12/1998 |
| JP | 2000-188013 A | 7/2000 |
| JP | 2002-042825 A | 2/2002 |
| JP | 2002212234 A | 7/2002 |
| JP | 2002-324559 A | 11/2002 |
| JP | 2003-246906 A | 9/2003 |
| JP | 2005-248104 A | 9/2005 |
| JP | 2005-272970 A | 10/2005 |
| JP | 2007-157645 A | 6/2007 |
| JP | 2008-186798 A | 8/2008 |
| JP | 2008-210572 A | 9/2008 |
| JP | 2009-054339 A | 3/2009 |
| JP | 2009-539225 A | 11/2009 |
| JP | 2010-089031 A | 4/2010 |
| JP | 2010-092799 A | 4/2010 |
| JP | 2010-214330 A | 9/2010 |
| JP | 2011-040363 A | 2/2011 |
| JP | 2011040363 A * | 2/2011 |
| JP | 2011-089143 A | 5/2011 |
| JP | 2011-134477 A | 7/2011 |
| JP | 2011-137216 A | 7/2011 |
| JP | 2011-218278 A | 11/2011 |
| JP | 2012-102345 A | 5/2012 |
| JP | 2012226970 A | 11/2012 |
| JP | 5699287 B2 | 4/2015 |
| WO | 1997/013287 A2 | 4/1997 |
| WO | 2005/045978 A2 | 5/2005 |
| WO | 2007/142884 A2 | 12/2007 |
| WO | 2009/045879 A2 | 4/2009 |
| WO | 2009/139747 A1 | 11/2009 |
| WO | 2009/139748 A1 | 11/2009 |
| WO | 2009/139749 A1 | 11/2009 |
| WO | 2010/048407 A1 | 4/2010 |
| WO | 2010/107426 A1 | 9/2010 |
| WO | 2010/123896 A2 | 10/2010 |
| WO | 2010/132050 A1 | 11/2010 |
| WO | 2011/112608 A1 | 9/2011 |
| WO | 2011129967 A2 | 10/2011 |
| WO | 2011/148466 A1 | 12/2011 |
| WO | 2012-096653 A1 | 7/2012 |
| WO | 2012/105107 A1 | 8/2012 |
| WO | 2012/125138 A1 | 9/2012 |
| WO | 2012/144974 A1 | 10/2012 |
| WO | 2012/174463 A1 | 12/2012 |

OTHER PUBLICATIONS

Telkar et al., "Shape-controlled preparation and catalytic activity of metal nanoparticles for hydrogenation of 2-butyne-1,4-diol and styrene oxide." Applied Catalysis A: General, 273 (2004) 11-19.

Alcaide et al., "Performance of carbon-supported PtPd as catalyst for hydrogen oxidation in the anodes of proton exchange membrane fuel cells," *International Journal of Hydrogen Energy* 35:11634-11641, 2010.

Greeley et al., "Theoretical Trends in Particle Size Effects for the Oxygen Reduction Reaction," *Zeitschrift fur Physikalische Chemie* 221(9-10):1209-1220, 2007.

Kondo et al., "Active Sites for the Oxygen Reduction Reaction on the Low and High Index Planes of Palladium," *The Journal of Physical Chemistry Letters C* 113(29):12625-12628, 2009.

Lim et al., "Facile Synthesis of Bimetallic Nanoplates Consisting of Pd Cores and Pt Shells through Seeded Epitaxial Growth," *Nano Letters* 8(8):2535-2540, 2008.

Lim et al., "Pd-Pt Bimetallic Nanodendrites with High Activity for Oxygen Reduction," *Science* 324:1302-1305, Jun. 2009.

Neburchilov et al., "A review of polymer electrolyte membranes for direct methanol fuel cells," *Journal of Power Sources* 169:221-238, 2007.

Niu et al., "Seed-Mediated Growth of Nearly Monodisperse Palladium Nanocubes with Controllable Sizes," *Crystal Growth & Design* 8(12):4440-4444, 2008.

Stamenkovic et al., "Improved Oxygen Reduction Activity on $Pt_3Ni(111)$ via Increased Surface Site Availability," *Science* 315:493-497, 2007.

Tao et al., "Shape Control of Colloidal Metal Nanocrystals," *small* 4(3):310-325, 2008.

Vidal-Iglesias et al., "Pd Adatom Decorated (100) Preferentially Oriented Pt Nanoparticles for Formic Acid Electrooxidation," *Angewandte Chemi International Edition* 122:7152-7155, 2010.

Zhang et al., "Platinum Monolayer Electrocatalysts for $O_2$ Reduction: Pt Monolayer on Pd(111) and on Carbon-Supported Pd Nanoparticles," *J. Phys. Chem. B* 108:10955-10964, 2004.

Zhang et al., "Platinum Monolayer on Nonnoble Metal-Noble Metal Core-Shell Nanoparticle Electrocatalysts for $O_2$ Reduction," *J. Phys. Chem. B* 109(48):22701-22704, 2005.

Zhou et al., "Palladium alloy catalyst research to formic acid catalytic performance," *The 8th National Academic Conference of Hydrogen Energy*, Oct. 12, 2007 (w/ partial English translation), 4 pages.

Jin et al., "Synthesis of Pd Nanocrystals Enclosed by {100} Facets and with sizes <10 nm for Application in CO Oxidation," *Nano Res.* 4(1): 83-91, 2011.

Zhou et al., "Determination of the Electron Transfer Number for the Oxygen Reduction Reaction: From Theory to Experiment," *ACS Catalysis* 2016 6, 4720-4728.

\* cited by examiner

PROTON EXCHANGE MATERIAL AND METHOD THEREFOR

BACKGROUND

This disclosure relates to fluoropolymers that are used as proton exchange materials in applications such as fuel cells.

Electrochemical devices, such as fuel cells, are commonly used for generating electric current. A single fuel cell typically includes an anode catalyst, a cathode catalyst, and an electrolyte between the anode and cathode catalysts for generating an electric current in a known electrochemical reaction between reactants. The electrolyte can be a proton exchange material, which is also known as or "PEM."

One common type of polymer exchange material is perfluorinated sulfonic acid (PFSA), such as NAFION® (E. I. du Pont de Nemours and Company). PFSA polymer consists of a perfluorinated carbon-carbon backbone, to which are attached perfluorinated side chains. Each side chain terminates in a sulfonic acid group that works as a proton exchange site to transfer or conduct protons between the anode and cathode electrodes.

The proton conductivity of PFSA polymers varies in relation to relative humidity (RH) and temperature. The relation between conductivity and level of hydration is based on two different mechanisms of proton transport. One is a vehicular mechanism, where the proton transport is assisted by the water in the membrane, and the other is a hopping mechanism, where the proton hops along the sulfonic acid sites. While the vehicular mechanism is dominant at high relative humidity conditions, the hopping mechanism becomes important at low relative humidity conditions.

PEM fuel cells, especially for automobile applications, are required to be able to operate at high temperature ($\geq 100°$ C.) and low RH ($\leq 25\%$ RH) conditions, in order to reduce the radiator size, simplify the system construction and improve overall system efficiency. Consequently, PEM materials with high proton conductivity at high temperature and low RH conditions are needed.

PFSA polymer is usually prepared by free radical copolymerization of tetrafluoroethylene (TFE) and per-fluorinated (per-F) vinyl ether monomer (such as perfluoro-2-(2-fluorosulfonylethoxy) propyl vinyl ether, or "PSEPVE", for NAFION®). One approach to produce a PFSA polymer with improved proton conductivity is to decrease the TFE content in the product polymer. An indicator of conductivity of an electrolyte material is equivalent weight (EW), or grams of polymer required to neutralize 1 mol of base. The most common equivalent weights of commercially available PFSA polymers (such as NAFION®) are between ~800 and ~1100 g/mol, which provide a balance between conductivity and mechanical properties. While PFSA polymer with EW in this range is needed, increasing conductivity below a certain EW renders the electrolyte water soluble and not suitable for PEM applications.

Per-F sulfonimide (SI) acids (such as Bis (trifluoromethane) sulfonimide, $CF_3-SO_2-NH-SO_2-CF_3$) show favorable properties, including strong acidity, excellent chemical and electrochemical stability, for PEM fuel cell applications. Linear per-F sulfonimide polymers (PFSI), prepared by copolymerization of TFE and SI-containing per-F vinyl ether monomer, were first reported by DesMarteau, et al. (U.S. Pat. No. 5,463,005). A linear PFSI polymer with EW in the range of 1175-1261 g/mol for PEM application was reported by Creager, et al. (Polymeric materials: science and engineering—WASHINGTON—80, 1999: 600). Per-F vinyl ether monomer that contains two SI groups was also synthesized, and the corresponding linear PFSI polymer with the EW of 1175 g/mol was prepared and demonstrated to have high thermal and chemical stability in PEM fuel cell operating conditions (Zhou, Ph.D. thesis 2002, Clemson University). Reducing TFE content in the PFSI polymers is an efficient way to increase the proton conductivity of the product polymers. Linear PFSI polymer with the EW of 970 g/mol was reported in the literature (Xue, thesis 1996, Clemson University). However, such type of linear PFSI polymer with even lower EW is difficult to synthesize through free-radical copolymerization process and also renders the polymer water soluble below a certain EW threshold.

The preparation of PFSI polymer with calculated EW of ~1040 by chemical modification of PFSA polymer resin (in $-SO_2-F$ form) was reported in a Japanese patent (Publication No: 2002212234). Furthermore, a more efficient chemical modification process was reported by Hamrock et al. (Publication No. WO 2011/129967). In this process, a linear PFSA polymer resin (in $-SO_2-F$ form) was treated with ammonia in acetonitrile (ACN) to convert the $-SO_2-F$ groups to sulfonamide ($-SO_2-NH_2$) groups, which then reacted with a per-F disulfonyl difluoride compound (such as $F-SO_2-(CF_2)_3-SO_2-F$) to convert to $-SO_2-NH-SO_2-(CF_2)_3-SO_3H$ in the final product. By starting with PFSA (in $-SO_2-F$ form) with EW of 800 g/mol, water-insoluble polymer electrolyte with EW as low as ~625 g/mol was reported. However, polymer electrolyte with even lower EW (<625 g/mol) resulted in a water soluble polymer and hence is not suitable for PEM applications.

SUMMARY

A proton exchange material includes a linear perfluorinated carbon backbone chain and a side chain extending off of the linear perfluorinated carbon backbone chain. The side chain includes at least one sulfonimide group, $-SO_2-NH-SO_2-$, and a carbon chain link between the at least one sulfonimide group and the linear perfluorinated carbon backbone chain. The carbon chain link has less than three carbon atoms.

A method for producing a proton exchange material includes forming a polymer having a linear perfluorinated carbon backbone chain and a side chain extending off of the linear perfluorinated carbon backbone chain. The side chain includes at least one sulfonimide group, $-SO_2-NH-SO_2-$, and a carbon chain link between the at least one sulfonimide group and the linear perfluorinated carbon backbone chain. The carbon chain link has less than three carbon atoms.

DETAILED DESCRIPTION

Electrochemical devices, such as fuel cells for automobiles or other similar applications, can operate at relatively high temperatures and low relative humidity conditions to reduce radiator size, simplify system construction and improve overall system efficiency. It is therefore desirable to utilize proton exchange materials that maintain high proton conductivity at the relatively high temperatures and low relative humidity conditions. In this regard, disclosed is a proton exchange material that has a relatively low equivalent weight and good chemical stability in harsh environments that may include free radical chemical intermediaries.

The proton exchange material includes a linear perfluorinated carbon backbone chain and a side chain extending off the linear perfluorinated carbon backbone chain. As can be appreciated, the proton exchange material can include many of the linear perfluorinated carbon backbone chains and each of these chains can include many of the side chains. In this disclosure, the term "linear" refers to the architecture of the polymer with respect to the perfluorinated carbon backbone chain (i.e., main chain) being free of crosslink connections to any other linear perfluorinated carbon backbone chains.

The side chain that extends off the linear perfluorinated carbon backbone chain includes one or more sulfonimide groups, $-SO_2-NH-SO_2-$, and a carbon chain link between the one or more sulfonimide groups and the linear perfluorinated carbon backbone chain. The carbon chain link has less than three carbon atoms. In a further example, the carbon chain link has two carbon atoms or one carbon atom.

In a further example, the one or more sulfonimide groups includes a foremost sulfonimide group, with respect to the linear perfluorinated carbon backbone chain. In other words, the foremost sulfonimide group is the closest sulfonimide group along the side chain to the linear perfluorinated carbon backbone chain. In one example, the carbon chain link is located between the foremost sulfonimide group and the linear perfluorinated carbon backbone chain. The carbon chain link can be a foremost, or closest, carbon chain link along the side chain with respect to the linear perfluorinated carbon backbone chain.

In a further example, the side chain terminates at a free end with a $-CF_3$ group. Additionally, the one or more sulfonimide groups can include at least two sulfonimide groups and in other examples may include more than two sulfonimide groups. In a further example, the equivalent weight of the proton exchange material is 800 or less.

In a further example, the proton exchange material has a repeat unit, Structure I shown below. In this example, the side chain $-O-CF_2-CF_2-SI-Rf-SI-CF_3$ has an ether linkage connecting the side chain to the linear perfluorinated carbon backbone chain. SI is sulfonimide and Rf is $-(CF_2)_n-$, where n is 1-6, or Rf is $-(CF_2)_n-O-(CF_2)_{n'}$, where n' is 1-4. The linear perfluorinated carbon backbone chain is $-(CF_2-CF_2)_x-(CF_2-CF)-$, where x is 2-7. In a further example, x is 4-5.

Structure I

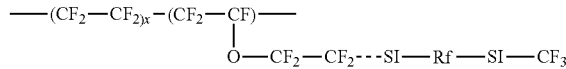

The disclosed proton exchange material thus has a relatively short side chain which permits a low EW without water-solubility. Each of the side chains can also include multiple sulfonimide groups to further lower EW, while not sacrificing water-stability. Further, the side chains of the disclosed proton exchange material are free terminal carbon-sulfur bonded groups, such as the group $-CF_2-SO_3H$, which may be susceptible to chemical attack from hydroxyl (•OH) and hydroperoxyl (•OOH) radicals. The proton exchange material thus also has good chemical stability.

A method for producing a proton exchange material includes forming a polymer having any or all of the above chemical structural features. In one example, the forming includes synthesizing a perfluorinated sulfonic acid precursor and converting sulfonic acid groups, $-SO_2F$, in the perfluorinated sulfonic acid precursor to amide groups, $-SO_2-NH_2$. The amide groups are then converted to the one or more sulfonimide groups.

In one example, the forming includes free radical copolymerizing tetrafluoroethylene and a perfluorinated vinyl ether monomer to produce the linear perfluorinated carbon backbone chain and a precursor side chain extending off of the linear perfluorinated carbon backbone chain. The precursor side chain terminates in a sulfonyl fluoride group, $-SO_2-F$. This product is then exposed to ammonia to convert the sulfonyl fluoride group to a sulfonamide group, $-SO_2-NH_2$. This product is then contacted with an end-capping agent to convert the sulfonamide group to the side chain including the one or more sulfonimide group. In a further example, the end-capping agent is $F-SO_2-Rf-SI-CF_3$, where SI is sulfonimide and Rf is either $-(CF_2)_n-$, where n is 1-6, or $-(CF_2)_n-O-(CF_2)_{n'}$, where n' is 1-4. Further useful techniques can be found in PCT Application No. PCT/US2012/017358, entitled METHOD OF FABRICATING AN ELECTROLYTE MATERIAL, incorporated herein by reference in its entirety.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A proton exchange material comprising:
a linear perfluorinated carbon backbone chain; and
a side chain extending off of the linear perfluorinated carbon backbone chain, the side chain being $-O-CF_2-CF_2-SI-Rf-SI-CF_3$, wherein SI is sulfonamide and Rf is $-(CF_2)_n-O-(CF_2)_{n'}$, where n' is 1-4.
2. The proton exchange material as recited in claim 1, having an equivalent weight of 800 or less.
3. The proton exchange material as recited in claim 1, wherein the linear perfluorinated carbon backbone chain is $-(CF_2-CF_2)_x-(CF_2-CF)-$, where x is 2-7.
4. The proton exchange material as recited in claim 3, wherein x is 4-5.
5. A method for producing a proton exchange material, the method comprising:
forming a polymer having a linear perfluorinated carbon backbone chain and a side chain extending off of the linear perfluorinated carbon backbone chain, the side chain being $-O-CF_2-CF_2-SI-Rf-SI-CF_3$, wherein SI is sulfonimide and Rf is $-(CF_2)_n-O-(CF_2)_{n'}$, where n' is 1-4.
6. The method as recited in claim 5, wherein the forming includes:
(a) copolymerizing tetrafluoroethylene and a perfluorinated vinyl ether monomer to produce the linear perfluorinated carbon backbone chain and a precursor side chain extending off of the linear perfluorinated carbon backbone chain, the precursor side chain terminating in a sulfonyl fluoride group, $-SO_2-F$,

(b) exposing a product of said step (a) to ammonia to convert sulfonyl fluoride group to a sulfonamide group, —$SO_2$—$NH_2$, and (c) contacting a product of said step (b) with an end-capping agent to convert the sulfonamide group to the side chain including a sulfonimide group.

7. The method as recited in claim 6, wherein the end-capping agent is F—$SO_2$—Rf—SI—$CF_3$, wherein SI is sulfonimide and Rf is —$(CF_2)_{n'}$—O—$(CF_2)_{n'}$, where n' is 1-4.

8. The method as recited in claim 5, wherein the forming includes synthesizing a perfluorinated sulfonic acid precursor and converting sulfonyl fluoride groups, —$SO_2F$, in the perfluorinated sulfonic acid precursor to amide groups, —$SO_2$—$NH_2$.

9. The method as recited in claim 8, wherein the forming includes converting the amide groups, —$SO_2$—$NH_2$, to a sulfonimide group.

\* \* \* \* \*

UNITED STATES PATENT AND TRADEMARK OFFICE
CERTIFICATE OF CORRECTION

PATENT NO.         : 9,923,224 B2
APPLICATION NO.    : 14/654455
DATED              : March 20, 2018
INVENTOR(S)        : Zhiwei Yang et al.

Page 1 of 1

It is certified that error appears in the above-identified patent and that said Letters Patent is hereby corrected as shown below:

In the Claims

Column 4, Lines 42-43:
"wherein SI is sulfonamide and Rf" should read, --wherein SI is sulfonimide and Rf--.

Signed and Sealed this
Nineteenth Day of February, 2019

Andrei Iancu
*Director of the United States Patent and Trademark Office*